United States Patent
Kojima (10) Patent No.: US 8,736,144 B2
(45) Date of Patent: May 27, 2014

(54) VIBRATION TYPE DRIVING APPARATUS

(75) Inventor: Nobuyuki Kojima, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 135 days.

(21) Appl. No.: 13/312,243

(22) Filed: Dec. 6, 2011

(65) Prior Publication Data

US 2012/0146459 A1   Jun. 14, 2012

(30) Foreign Application Priority Data

Dec. 10, 2010   (JP) .................... 2010-276161

(51) Int. Cl.
*H01L 41/08*   (2006.01)
*H02N 2/00*   (2006.01)

(52) U.S. Cl.
USPC .............. 310/323.16; 310/317; 310/316.01

(58) Field of Classification Search
USPC ......... 310/316, 323, 365, 366, 367, 368, 357, 310/342, 323.17, 323.13, 317, 316.01, 310/316.02, 320, 321, 323.01, 323.06
IPC .............. H01L 41/08; H02N 2/00,2/026, 2/103
See application file for complete search history.

(56) References Cited

U.S. PATENT DOCUMENTS

| | | | | |
|---|---|---|---|---|
| 5,270,607 A * | 12/1993 | Terajima | ................ | 310/316.01 |
| 5,453,653 A * | 9/1995 | Zumeris | ................ | 310/323.16 |
| 5,850,117 A | 12/1998 | Tobe | | |
| 7,646,136 B2 * | 1/2010 | Adachi et al. | ............ | 310/323.16 |
| 7,671,518 B2 | 3/2010 | Sawada | | |

FOREIGN PATENT DOCUMENTS

| | | |
|---|---|---|
| JP | 6-204778 A | 7/1994 |
| JP | 9-215349 A | 8/1997 |
| JP | 10-146070 A | 5/1998 |
| JP | 2002-223577 A | 8/2002 |
| JP | 2006-254683 A | 9/2006 |

* cited by examiner

*Primary Examiner* — Thomas Dougherty
*Assistant Examiner* — Karen B Addison
(74) *Attorney, Agent, or Firm* — Canon USA Inc IP Division (57) ABSTRACT

A vibrator according to an aspect of the present invention is provided with an adjustment region which is realized with use of an electro-mechanical energy conversion element that is designed for an adjustment on a resonance frequency, and an impedance element is arranged to be connected to the adjustment region.

15 Claims, 12 Drawing Sheets

MODE-B

FIG. 4A

MODE-A

MODE-B

FIG. 12C

MODE-A

VIBRATION TYPE DRIVING APPARATUS

BACKGROUND OF THE INVENTION

1. Field of the Invention

The present invention relates to a vibration type driving apparatus. In particular, the invention relates to a vibrator that generates vibrations obtained by combining two different vibration modes with each other and a vibration type driving apparatus having the vibrator.

2. Description of the Related Art

A vibrator using a piezoelectric element that functions as an electro-mechanical energy conversion element is used for an oscillator, an actuator, or the like. In the above-mentioned vibrator, a resonance frequency is decided on the basis of a material characteristic, a shape, and dimensions, but because of a characteristic fluctuation in a piezoelectric material forming the piezoelectric element or a working error of part dimensions, a fluctuation in the resonance frequencies of the individual vibrators is caused. Since the resonance frequency of the vibrator directly affects an output characteristic of the vibrator, an adjustment on the resonance frequency needs to be conducted.

In particular, in a case where the vibrator and a driven member are relatively moved by vibrations obtained by combining two different vibration modes (vibration shapes) with each other, a resonance frequency difference between these two vibration modes needs to be contained in a desired relationship.

As a method of adjusting the resonance frequency, the following methods are proposed. One is a method of adjusting the resonance frequency by changing the dimensions of the vibrator. For this method, a method of removing a part of the vibrator through a laser process to decrease the dimensions is disclosed (see Japanese Patent Laid-Open No. 6-204778). The other one is a method of utilizing an electro-mechanical conversion effect of the piezoelectric element. According to this method, a driving electrode and an adjusting electrode are provided on a surface of the piezoelectric element provided to the vibrator, and the resonance frequency is adjusted through insulation and continuity of the driving electrode and the adjusting electrode (see U.S. Pat. No. 7,671,518).

However, like Japanese Patent Laid-Open No. 6-204778, according to the method of removing a part of the vibrator to change the dimensions of the vibrator, since heat is applied at the time of the process and a change in the material characteristic occurs, which may lead to a degradation in a vibrating characteristic. Also, a readjustment may be difficult because of the noninvertible process of removing the part of the vibrator.

Also, according to the method disclosed in U.S. Pat. No. 7,671,518, since the process is applied on the vibrator for the adjustment, a readjustment may be difficult once the adjustment has been conducted, and in a case where the adjustment is to be implemented, the procedure is complex. Furthermore, an output of the vibrator changes since the size of the driving electrode is changed along with the adjustment processing, which may cause a fluctuation in the output.

SUMMARY OF THE INVENTION

The present invention has been made in view of the above-mentioned problems and aims to simply and accurately adjust a difference in resonance frequencies between two different vibration modes.

A vibration type driving apparatus according to an aspect of the present invention is a vibration type driving apparatus having a vibrator that generates vibrations obtained by combining two different vibration modes with each other by applying an alternating voltage to an electro-mechanical energy conversion element for a vibration generation, in which the vibrator is provided with an electro-mechanical energy conversion element for a resonance frequency adjustment, and an impedance element is connected between electrode provided to the electro-mechanical energy conversion element for the resonance frequency adjustment.

According to the aspect of the present invention, it is possible to accurately adjust the difference in the resonance frequencies between the two different vibration modes by using the simple configuration. According to this, it is possible to eliminate the individual difference of the vibrator caused by the resonance frequency fluctuation.

Further features of the present invention will become apparent from the following description of exemplary embodiments with reference to the attached drawings.

DESCRIPTION OF THE EMBODIMENTS

Hereinafter, embodiments of the present invention will be described in detail with reference to the drawings.

First Embodiment

Figure 1:
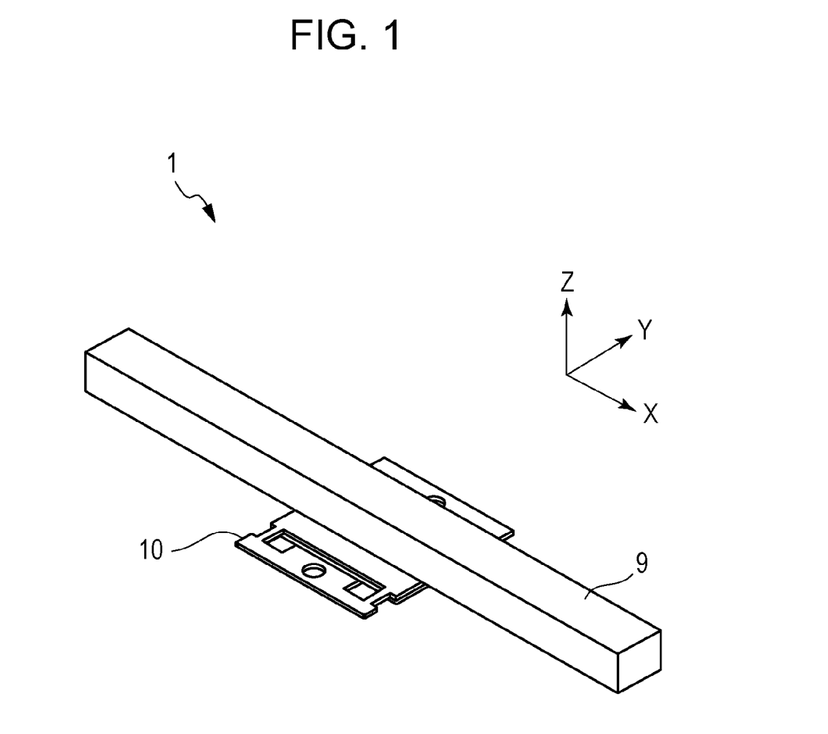
FIG. 1 is a perspective view of a vibrator and a driven member to which a first embodiment of the present invention can be applied.

FIG. 1 is a perspective view illustrating a configuration of main parts of a vibration type driving apparatus 1 to which the present invention can be applied. The vibration type driving apparatus 1 is constructed by using a vibrator 10 and a driven member 9 as main parts. The vibrator 10 and the driven member 9 are contacted under pressure at a desired location, and the vibrator 10 and the driven member 9 are relatively moved in an X direction illustrated in FIG. 1 by an action of vibrations excited by the vibrator 10. According to the present embodiment, the vibration type driving apparatus 1 is provided with, although omitted in FIG. 1, a control circuit (see FIG. 5) composed of an adjustment circuit 8, a command circuit 7, and an output circuit 6, in addition to the vibrator 10 and the driven member 9. Also, the vibrator 10 may be provided with a connection board such as a flexible print board for an electric connection with the control circuit.

Figure 2:
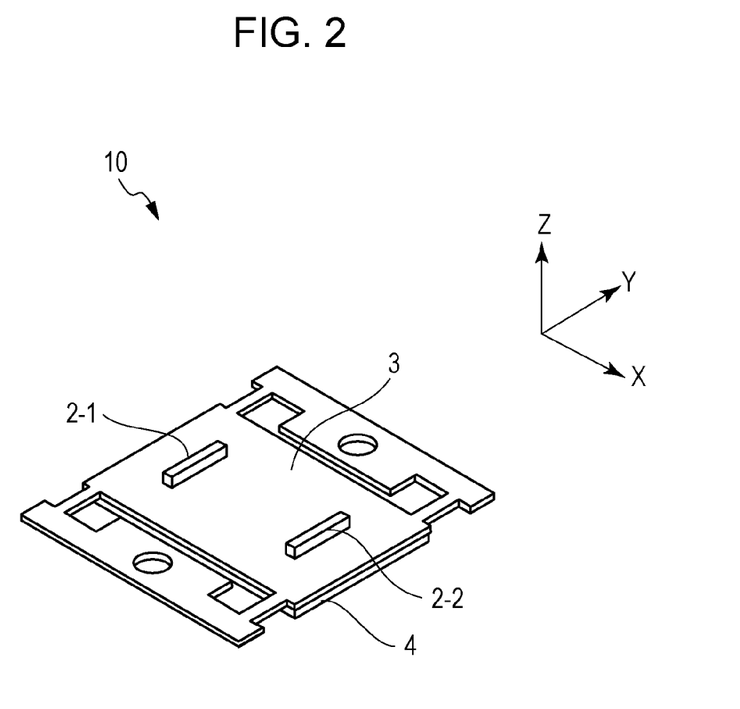
FIG. 2 is a perspective view of the vibrator to which the first embodiment of the present invention can be applied.

FIG. 2 is a perspective view of the vibrator 10. The vibrator 10 is provided with a vibrating plate 3 composed of a plate-shaped elastic body having two protruding parts 2-1 and 2-2 as contact parts with the driven member 9 and an electro-mechanical energy conversion element 4 which substantially has a rectangular shape and is joined to the vibrating plate 3. Also, the vibrator 10 is provided with a flexible print board which is not illustrated in the drawing for an external electric connection with the electro-mechanical energy conversion element 4. A piezoelectric element or the like can be used for the electro-mechanical energy conversion element 4.

Figure 3:
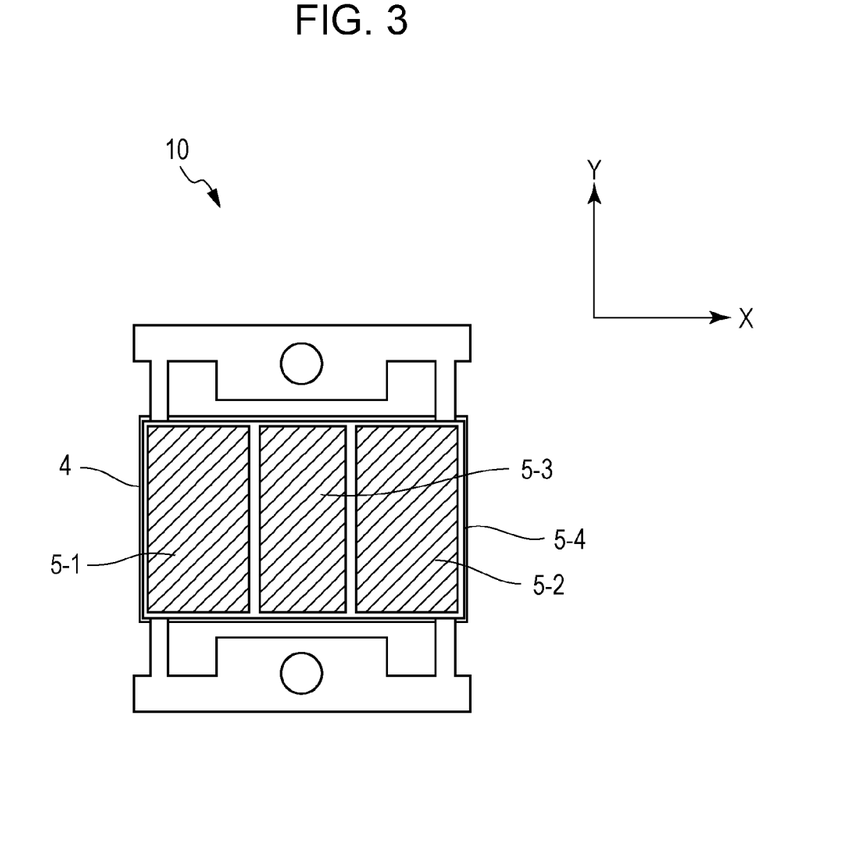
FIG. 3 is a bottom view of the vibrator to which the first embodiment of the present invention can be applied.

On the electro-mechanical energy conversion element 4, as illustrated in FIG. 3, three electrodes 5-1, 5-2, and 5-3 are formed, and also on a surface opposing the three electrodes 5-1, 5-2, and 5-3 via the electro-mechanical energy conversion element 4, a full-face electrode 5-4 is formed substantially across the entire surface. A polarization processing is applied on the electro-mechanical energy conversion element 4 in advance between the electrodes 5-1, 5-2, and 5-3 and the full-surface electrode 5-4.

Regions of the electro-mechanical energy conversion element 4 sandwiched by the electrodes 5-1, 5-2, and 5-3 and the full-surface electrode 5-4 are respectively set as R-1, R-2, and R-3. The regions R-1 and R-2 act as drive regions (regions for a vibration generation) where deforming force is generated by receiving an electric signal from an external section. The region R-3 acts as an adjustment region which will be described below. According to the present embodiment, the region of one electro-mechanical energy conversion element 4 is separately used as the drive region and the adjustment region, but mutually different electro-mechanical energy conversion elements may be provided for the drive and the adjustment. According to the present invention, a case where the region of one electro-mechanical energy conversion element is separately used as the drive region (region for the vibration generation) and the adjustment region becomes synonymous with a case where the electro-mechanical energy conversion element for the drive (for the vibration generation) and the electro-mechanical energy conversion element for the adjustment are provided.

As illustrated in FIG. 3, the electrode 5-3 is arranged in the center in the X direction, and the electrodes 5-1 and 5-2 are formed so as to be symmetric in the X direction via the electrode 5-3. According to the present invention, "symmetric in the X direction" and "center in the X direction" include not only a location "completely symmetric in the X direction" and a location "completely center in the X direction" but also a location deemed to be substantially symmetric in the X direction and a location deemed to be substantially in the center in the X direction within a permissible error range.

Figure 5:
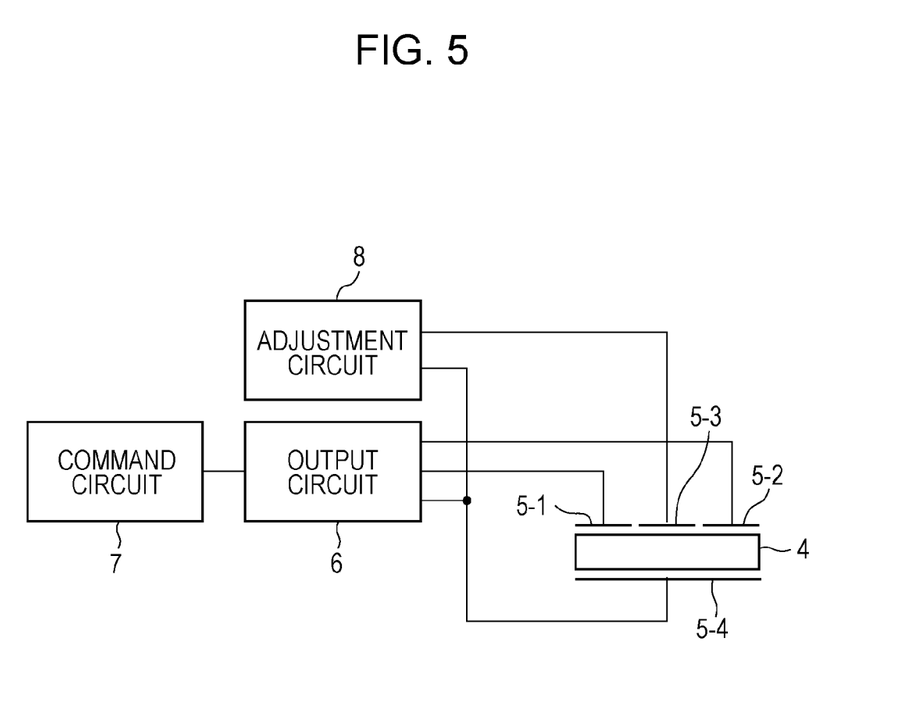
FIG. 5 is a schematic diagram of a command circuit of the vibrator to which the first embodiment of the present invention can be applied.

FIG. 5 is a schematic diagram of a control circuit that controls the vibrator 10. The control circuit according to the present embodiment is provided with the output circuit 6, the command circuit 7, and the adjustment circuit 8. The electrodes 5-1, 5-2, and 5-4 are connected to the output circuit 6 that performs an output of a drive signal (alternating voltage). As described above, in the electro-mechanical energy conversion element 4, the regions R-1 and R-2 to which the drive signals are applied by the electrodes 5-1, 5-2, and 5-4 are used as the drive region. The command circuit 7 sends a command to the output circuit 6 to output a desired drive signal. According to the present invention, the command circuit 7 and the output circuit 6 constitute a drive circuit for driving the vibrator. The adjustment circuit 8 is connected to the electrodes 5-3 and 5-4 to form a circuit together with the region R-3.

Figure 4A:
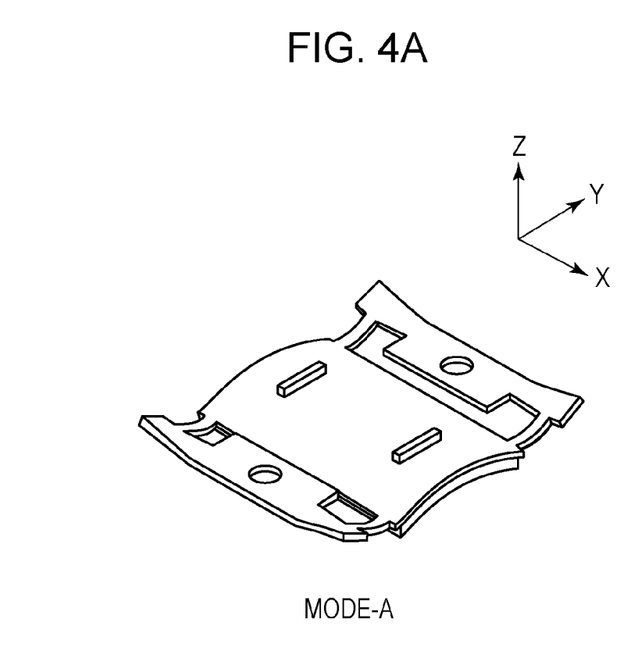
FIGS. 4A and 4B are perspective views representing vibration modes of the vibrator to which the first embodiment of the present invention can be applied.
Figure 4B:
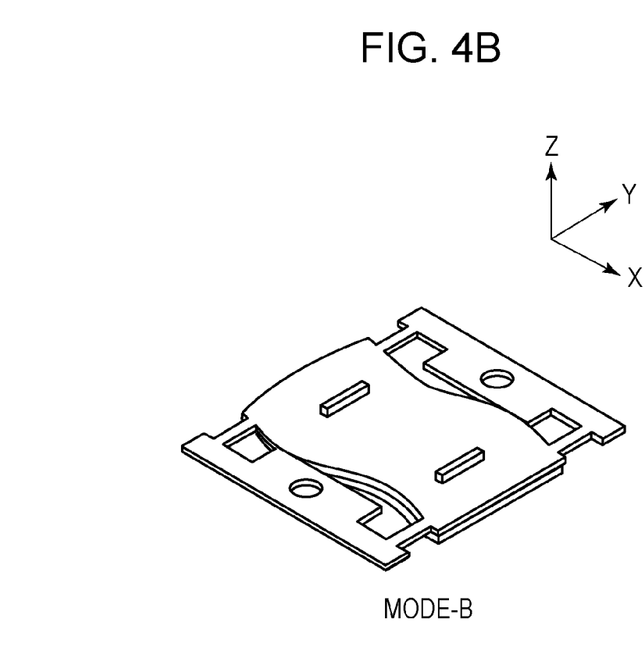

The two vibration modes excited by the vibrator 10 according to the present embodiment will be described by using FIGS. 4A and 4B. According to the present embodiment, the alternating voltage is applied between the electrodes 5-1 and 5-4 and between the electrodes 5-2 and 5-4 of the electro-mechanical energy conversion element 4 of the vibrator 10 to excite two out-of-plane bending vibration modes (MODE-A and MODE-B) in the vibrator 10. The MODE-A is a primary out-of-plane bending vibration mode where two nodes appear in parallel in an X axis direction in the drawing which is a longitudinal direction of the vibrator 10 and has a shape substantially symmetrical with respect to a YX plane. By the vibration in the MODE-A, motions displacing in a direction (Z axis direction) perpendicular to a plane contacted with the driven member are excited in the protruding parts 2-1 and 2-2. The MODE-B is a secondary out-of-plane bending vibration mode where three nodes appear substantially in parallel in a Y axis direction in the drawing of the vibrator 10 and has a shape inversely-symmetrical with respect to the YX plane. By the vibration in the MODE-B, motions displacing in a direction (X axis direction) parallel to the plane contacted with the driven member are excited in the protruding parts 2-1 and 2-2. By combining these two vibration modes, elliptic motions substantially in an XZ plane are generated on top surfaces of the protruding parts 2-1 and 2-2 functioning as the contact parts, and a force for driving the driven member 9 in a direction substantially matched with the X axis direction is generated. With this driving force, the driven member 9 is relatively moved with respect to the vibrator.

In the case of the configuration in which the driving force is generated in the vibrator 10 by the combination of the two vibration modes as in the present embodiment, whether a resonance frequency difference $\Delta F$ between these two vibration modes is a desired value or not affects the vibrating state of the vibrator 10. According to the present invention, the resonance frequency difference $\Delta F$ is defined as follows:

$$\Delta F = FB - FA$$

where FB denotes a resonance frequency of the MODE-B, and FA denotes a resonance frequency of the MODE-A.

If the resonance frequency difference $\Delta F$ is a desired value, the elliptic motions of the protruding parts 2-1 and 2-2 generated by the combination of the two vibration modes including the MODE-A and the MODE-B are set to be in a desired state. If the resonance frequency difference $\Delta F$ is away from the desired value, the elliptic motions of the protruding parts 2-1 and 2-2 are not set to be in the desired state, so that the driving force of the vibrator 10 is decreased, and further, the decrease in the output of the vibration type driving apparatus 1 is caused. Like the present embodiment, in the case of the vibrator combining the vibration mode (MODE-A) where the motion displacing in the Z axis direction is excited with the vibration mode (MODE-B) where the motion displacing in the X axis direction is excited, the resonance frequency difference $\Delta F$ is preferably larger than 0. That is, FB preferably has a frequency higher than that of FA.

Also, a range more preferably has 1.0 kHz≤ΔF≤2.0 kHz. It should be noted however that this range is in a preferable range in a case where the dimensions of the vibrator (sizes in the X direction and a Y direction) are approximately 5 to 20 mm, and this preferable range of ΔF varies depending on the dimensions of the vibrator or the like. Therefore, a desired value of ΔF may be appropriately set depending on the vibrator.

Herein, an adjustment method for the resonance frequency difference ΔF in the vibrator 10 will be described. The electro-mechanical energy conversion element 4 is formed of a piezoelectric material such as PZT (zirconate titanate), and this piezoelectric material has a conversion function of electric energy and mechanical energy as well as a function as a dielectric.

For example, in a case where stress in the same direction as the polarization is applied to the polarized piezoelectric material, electric charge is generated between two electrodes used for the polarization. If the two electrodes are in an insulating state, this electric charge is accumulated in the piezoelectric material, and if the two electrodes are short-circuited, the electric charge is not accumulated.

The state in which the electric charge is accumulated is a state in which the electric energy is accumulated, and a mechanical warp by external force becomes small as compared with a state in which the electric charge is not accumulated. This is equivalent to a state in which an elastic coefficient becomes large, and it is possible to adjust the elastic coefficient of the vibrator by controlling the electric charge accumulated in the piezoelectric material. If the stress operates in an alternation manner, the generated electric charge behaves in an alternating current manner, so that a current is generated. Therefore, since the alternating current is generated, it is possible to carry out the adjustment on the resonance frequency of the vibration modes of the vibrator (in other words, the adjustment on the resonance frequency difference ΔF) by connecting the impedance element between the electrodes provided to the piezoelectric element for the adjustment.

To adjust the resonance frequency difference ΔF, the resonance frequency of one of the two vibration modes may be changed. As described above, the region R-3 is formed at a location symmetrical with respect to an X direction illustrated in FIG. 3. By the deformation in the MODE-A, the electric charges at the same potential are generated in the entire region of the region R-3, and the electric charge appears on the electrode 5-3. On the other hand, as the time of the deformation in the MODE-B, like the mode shapes illustrated in FIGS. 4A and 4B, since the warps generated on a plus side and a minus side in the X direction have opposite directions, the electric charges generated in the region R-3 are set off, and the electric charge is not generated on the electrode 5-3 (in other words, the total sum of the electric charges generated in the region R-3 is zero). Therefore, since the adjustment circuit using the region R-3 only affects the resonance frequency in the MODE-A and can change this resonance frequency, it is possible to adjust the resonance frequency difference ΔF. Herein, according to the present invention, the total sum of the electric charges is not only the case of completely zero, but also within a range where the resonance frequency in the MODE-B is not substantially affected, the total sum of the electric charges is deemed as zero.

FIGS. 6A to 6F illustrate a relationship between the impedance value in a case where the impedance element is provided to the adjustment circuit and the resonance frequencies in the MODE-A and the MODE-B and a relationship between the impedance element and the resonance frequency difference ΔF.

Figure 6A:
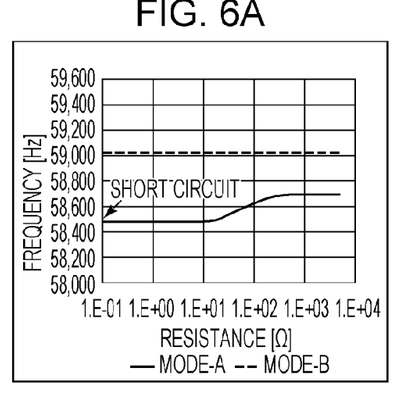
FIGS. 6A to 6F are graphic representations of characteristics of the vibrator to which the present invention can be applied.
Figure 6B:
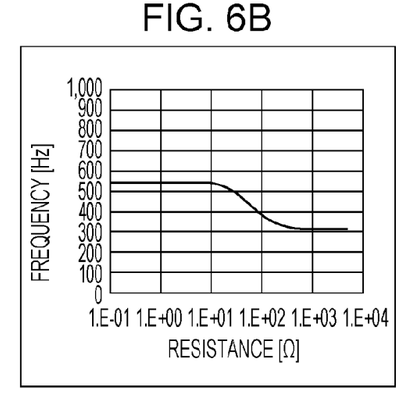

First, FIG. 6A illustrates the relationship between the value of the resistance element R and the resonance frequencies in the MODE-A and the MODE-B when a resistance element R is connected as the adjustment circuit 8 in series between the electrodes provided to the region R-3 functioning as the adjustment region. Then, FIG. 6B illustrates the relationship between the value of the resistance element R and the resonance frequency difference ΔF. Irrespective of the value of the resistance element R, the resonance frequency in the MODE-B is a constant value, and the resonance frequency in the MODE-A changes between approximately 10Ω and 1000Ω in a continuous fashion. As a result, it is possible to confirm that the resonance frequency difference ΔF also changes in a continuous fashion. According to the present embodiment, to set the resonance frequency difference ΔF as a desired value, the value of the resistance element R may be selected.

Also, even in a case where the adjustment on the resonance frequency difference ΔF is required again because of a reason such as a driving condition change, it is possible to easily deal with the situation by the replacement of the resistance element R. In a case where a variable resistance element is used as the resistance element R, the set value may be changed. Also, depending on the set value of the resonance frequency difference ΔF, short circuit may be carried out without using the resistance element R.

As described above, according to the present embodiment, the vibrator is provided with an electro-mechanical energy conversion element for a resonance frequency adjustment. Then, by connecting the resistance element R as the impedance element between electrodes of the electro-mechanical energy conversion element, the resonance frequency difference ΔF between the two vibration modes can be changed. Also, depending on the set value of ΔF, short circuit may be caused between the electrodes. In other words, according to the present embodiment, on the basis of the connection state between the electrodes of the electro-mechanical energy conversion element for the resonance frequency adjustment, it is possible to adjust the resonance frequency difference between the two vibration modes.

Second Embodiment

According to the first embodiment, it is characterized in that the resistance element R is connected as the impedance element, but according to the present embodiment, a capacitive element C such as a capacitor is used for the adjustment circuit 8. Since the other configuration is similar to the first embodiment, a description thereof will be omitted.

Figure 6C:
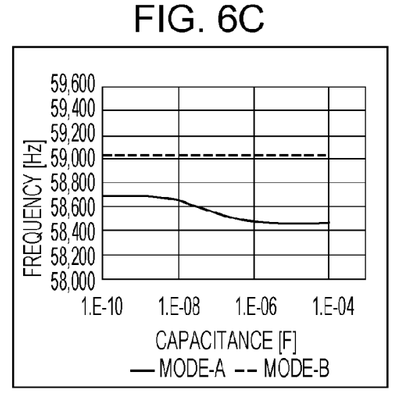
Figure 6D:
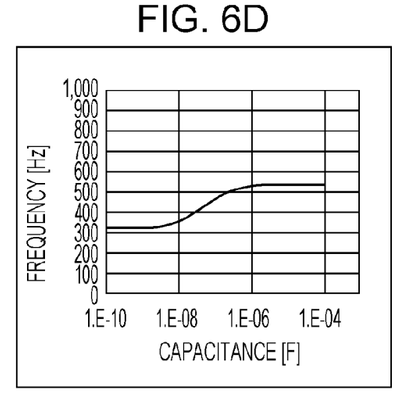

FIG. 6C illustrates a relationship between a value of the capacitive element C when the capacitive element C is connected in series between the electrodes of the region R-3 functioning as the adjustment region and the resonance frequencies in the MODE-A and the MODE-B, and FIG. 6D illustrates a relationship between the value of the capacitive element C and the resonance frequency difference ΔF. Irrespective of the value of the capacitive element C, the resonance frequency in the MODE-B is a constant value, and the resonance frequency in the MODE-A changes between approximately $5 \times 10^{-9}$ F and $5 \times 10^{-6}$ F in a continuous fashion. As a result, it is possible to confirm that the resonance frequency difference ΔF in a continuous fashion. To set the resonance frequency difference ΔF as a desired value, the value of the capacitive element C may be selected.

As described above, according to the present embodiment, by connecting the capacitive element C as the impedance element between the electrodes of the electro-mechanical energy conversion element for the resonance frequency adjustment, the resonance frequency difference ΔF between the two vibration modes can be changed.

Third Embodiment

According to the present embodiment, it is characterized in that an inductor element L such as a coil is used for the adjustment circuit 8. Since the other configuration is similar to the first embodiment, a description thereof will be omitted.

Figure 6E:
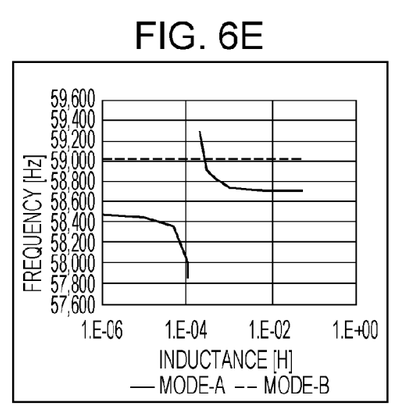
Figure 6F:
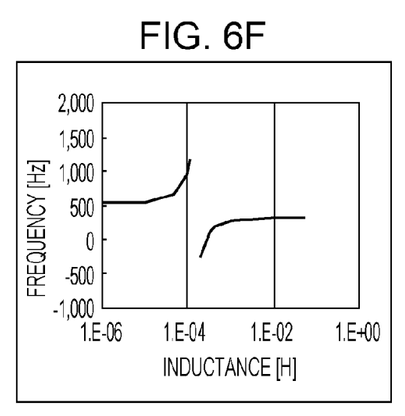

FIG. 6E illustrates a relationship between a value of the inductor element L when the inductor element L is connected in series between the electrodes of the region R-3 functioning as the adjustment region and the resonance frequencies in the MODE-A and the MODE-B, and FIG. 6F illustrates a relationship between the value of the inductor element L and the resonance frequency difference ΔF. Irrespective of the value of the inductor element L, the resonance frequency in the MODE-B is a constant value, and on the other hand, the resonance frequency in the MODE-A has a discontinuous and also large change in the vicinity of approximately $1 \times 10^{-4}$ H. As a result, the resonance frequency difference ΔF also shows a discontinuous and also large change. To set the resonance frequency difference ΔF as a desired value, the value of the inductor element L corresponding to this value may be selected.

As described above, according to the present embodiment, by connecting the inductor element L as the impedance element between the electrodes of the electro-mechanical energy conversion element for the resonance frequency adjustment, the resonance frequency difference ΔF between the two vibration modes can be changed.

Fourth Embodiment

Figure 7A:
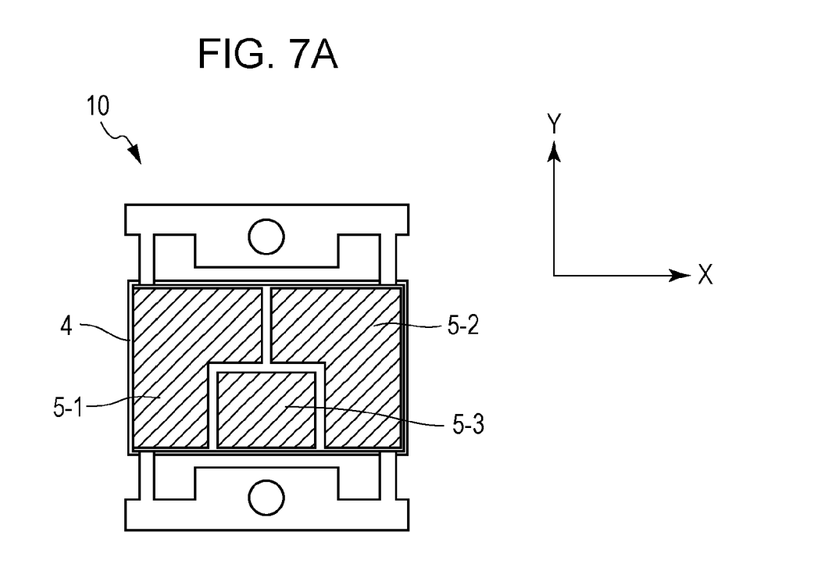
FIGS. 7A and 7B are bottom views of the vibrator to which a fourth embodiment of the present invention can be applied.
Figure 7B:
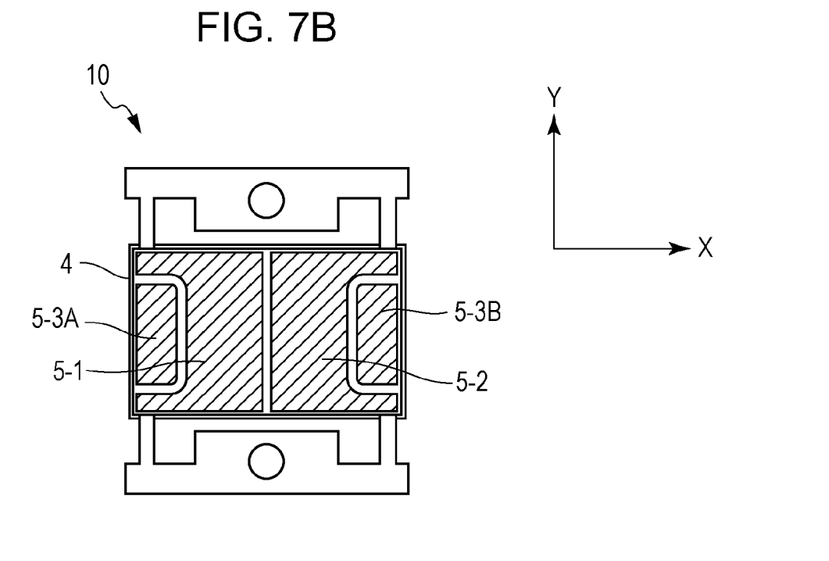

According to the present invention, the configuration of the electro-mechanical energy conversion element 4 is not limited to the configuration illustrated in FIG. 3. For example, it is also possible to decide the shape of the adjustment region while taking into account the configuration for the continuity and the like. According to the present embodiment, another configuration of the vibrator different from FIG. 3 will be described. Since a configuration other than the vibrator is similar to the first to third embodiments, a description thereof will be omitted. FIGS. 7A and 7B illustrate configurations of the vibrator according to the present embodiment. In the vibrator 10 illustrated in FIG. 7A, the electrode 5-3 is formed at the center part in the X direction only on a lower side in the Y direction so as to be symmetrical in the X direction.

Figure 8:
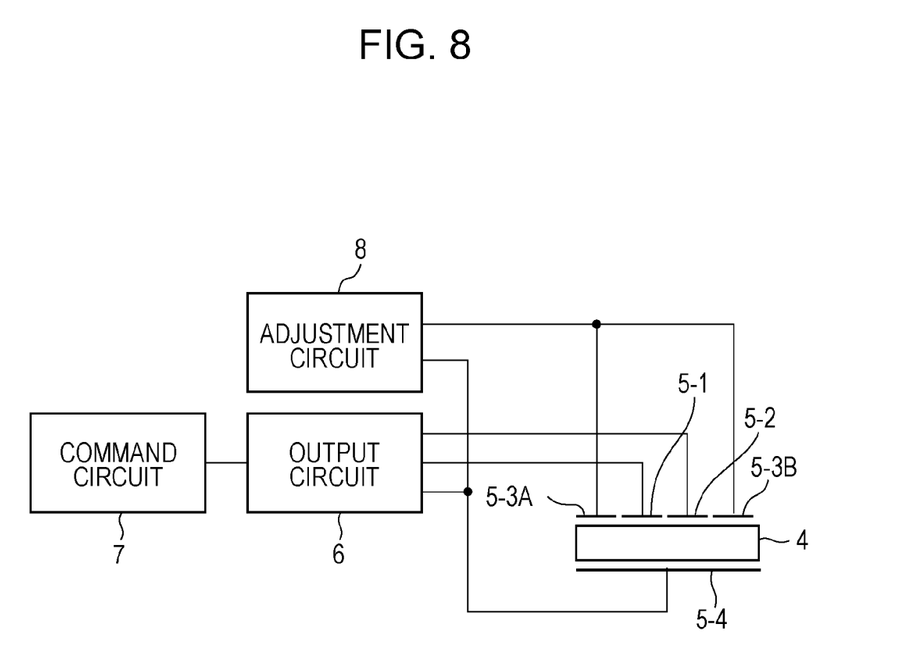
FIG. 8 is a schematic diagram of a command circuit of the vibrator to which the fourth embodiment of the present invention can be applied.

Also, a plurality of adjustment regions may be formed. In the electro-mechanical energy conversion element 4 illustrated in FIG. 7B, two electrodes 5-3A and 5-3B for an adjustment are formed at locations on outer sides in the X direction and symmetrical to each other. The regions R-3A and R-3B corresponding to these electrodes are polarized in the same direction. In each of the electrodes 5-3A and 5-3B for the adjustment, the electric charge is generated by the deformation in the MODE-B, but the electric charges have mutually converse signs, and the sizes are matched with each other. In other words, the total sum of the electric charges generated in the regions of the electro-mechanical energy conversion element 4 prescribed by the electrodes 5-3A and 5-3B (in this instance, in the electro-mechanical energy conversion element for the adjustment) becomes zero. On the other hand, by the deformation in the MODE-A, the electric charges having the same sign and the matched size are generated. As illustrated in FIG. 8, if the connection is made to the adjustment circuit 8 so that the outputs of the electrodes 5-3A and 5-3B for the adjustment are added, the frequency adjustment of the MODE-A can be carried out.

Also, in a case where the frequency of the MODE-B is desired to be adjusted, the polarization on the regions R-3A and R-3B may be carried out mutually in the opposite directions. In each of the electrodes 5-3A and 5-3B for the adjustment, the electric charge is generated by the deformation in the MODE-A, but the electric charges have mutually converse signs, and the sizes are matched with each other. On the other hand, by the deformation in the MODE-B, the electric charges having the same sign and the matched size are generated. As illustrated in FIG. 8, if the connection is made to the adjustment circuit 8 so that the outputs of the electrodes 5-3A and 5-3B for the adjustment are added, the frequency adjustment of the MODE-B can be carried out.

Fifth Embodiment

Figure 9:
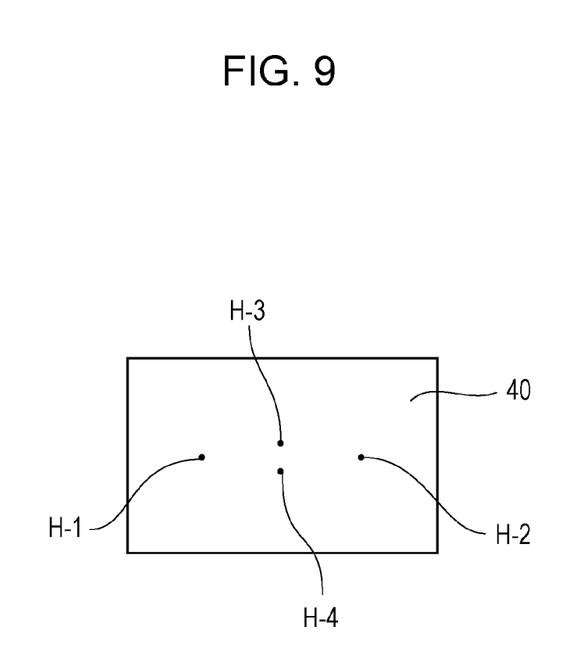
FIG. 9 is a plane view of a laminated piezoelectric element to which a fifth embodiment of the present invention can be applied.
Figure 10:
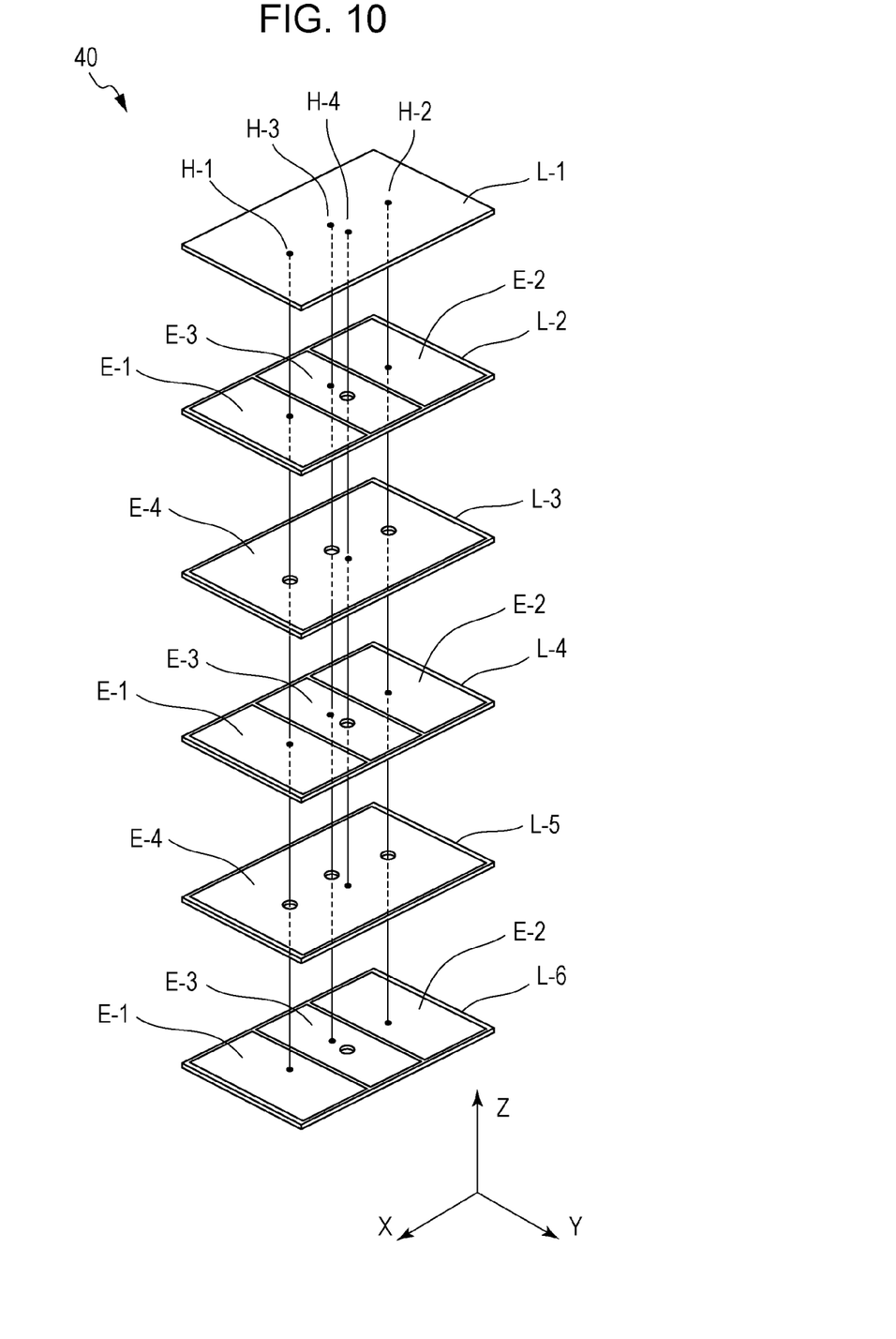
FIG. 10 is an exploded perspective view illustrating a configuration of the laminated piezoelectric element to which the fifth embodiment of the present invention can be applied.

According to the present invention, a laminated piezoelectric element may be used as the electro-mechanical energy conversion element. According to the present embodiment, it is characterized in that the laminated piezoelectric element is used as the electro-mechanical energy conversion element. Since the other configuration is similar to the first to fourth embodiments, a description thereof will be omitted. FIG. 9 is a front view of a laminated piezoelectric element 40 used according to the present embodiment. FIG. 10 is an exploded perspective view for describing an internal state of the laminated piezoelectric element 40.

The laminated piezoelectric element 40 is formed by laminating six plates of piezoelectric element plates L-1 to L-6. In the piezoelectric element plate L-1 arranged on the surface, electrodes are formed respectively in four via holes H-1 to H-4 as penetrating electrodes in a thickness direction. In the piezoelectric element plate L-2 at the second layer, three electrodes E-1 to E-3 are formed while avoiding the continuity with the electrode in the via hole H-4. The electrode E-3 is formed in the center of the X direction, and the electrodes E-1 and E-2 are formed at opposing locations while sandwiching the electrode E-3. In the piezoelectric element plate L-2, the via holes H-1 to H-4 are formed at the same locations in a projection manner as the piezoelectric element plate L-1. The piezoelectric element plate L-4 at the fourth layer has a configuration similar to the piezoelectric element plate L-2. In the piezoelectric element plate L-6 at the sixth layer too, the electrodes E-1 to E-3 are formed similarly as in the piezoelectric element plate L-2.

In the piezoelectric element plate L-3 at the third layer, the via holes H-1 to H-4 are formed, and also an electrode E-4 is formed substantially on an entire surface while avoiding the continuity with the electrodes in the via holes H-1 to H-3. The piezoelectric element plate L-5 at the fifth layer has a configuration similar to the piezoelectric element plate L-3.

The electrode in the via hole H-1 and the electrode E-1 have the same potential. Similarly, the electrode in the via hole H-2 and the electrode E-2, the electrode in the via hole H-3 and the electrode E-3, and the electrode in the via hole H-4 and the electrode E-4 respectively have the same potentials. According to the present embodiment, the region of the piezoelectric element plate sandwiched by the electrodes E-1 and E-4 and the region of the piezoelectric element plate sandwiched by the electrodes E-2 and E-4 are used as the drive regions for the vibration generation. Also, the region of the piezoelectric element plate sandwiched by the electrodes E-3 and E-4 is used as the adjustment region for the resonance frequency adjustment.

Sixth Embodiment

Figure 11:
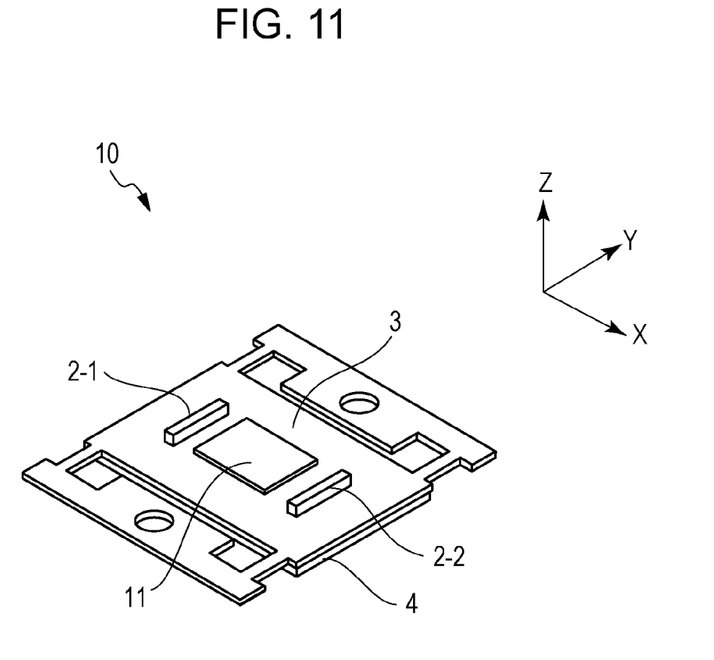
FIG. 11 is a perspective view of the vibrator to which a sixth embodiment of the present invention can be applied.

According to the present invention, a configuration and a driving method for the vibrator are not limited to the modes illustrated in the first embodiment. According to the present embodiment, first, a description will be given of a configuration in which a region of the electro-mechanical energy conversion element used for the resonance frequency adjustment is provided at a different location from the first embodiment. FIG. 11 is a perspective view of the vibrator 10 according to the present embodiment. The vibrator 10 is composed of the vibrating plate 3 formed of an elastic body, the electro-mechanical energy conversion element 4 for the drive (for the vibration generation), and an adjusting element 11 functioning as an electro-mechanical energy conversion element for a resonance frequency adjustment. The adjusting element 11 is arranged in a center position in the X and Y directions on the plane where the protruding parts 2-1 and 2-2 of the vibrator 10 are formed. The adjusting element 11 shows an effect similar to the region R-3 illustrated in FIG. 3.

Figure 12A:
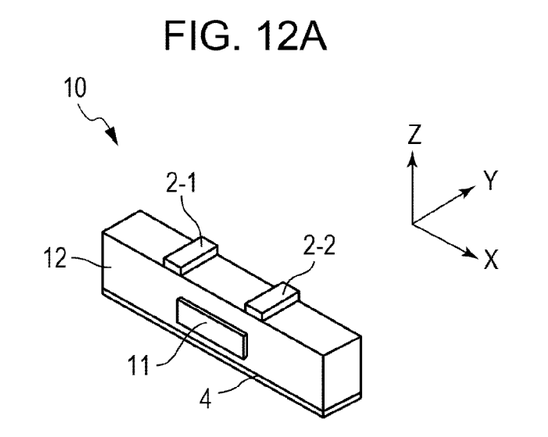
FIGS. 12A to 12C are perspective view representing the vibrator and vibration modes to which the present invention can be applied.
Figure 12B:
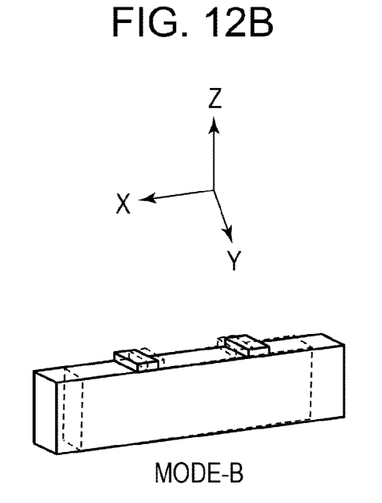
Figure 12C:
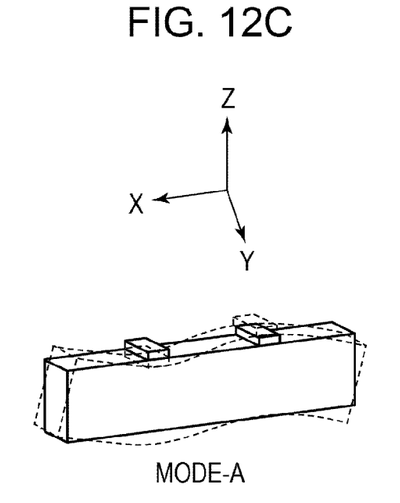

Next, a description will be given of a vibrator having a configuration of exciting vibrations in vibration modes different from those of the vibrator described in the first embodiment. The vibrator 10 illustrated in FIG. 12A has a substantially rectangular shape. In the vibrator 10, a primary stretching vibration mode (MODE-B) stretching in the X axis direction as illustrated in FIG. 12B and a secondary out-of-plane bending vibration mode (MODE-A) where three nodes appear substantially in parallel in the Y axis direction as illustrated in FIG. 12C are excited. The MODE-A and the MODE-B according to the present embodiment are different from the MODE-A and the MODE-B according to the first embodiment.

According to the present embodiment, by the vibration in the MODE-B, motions displacing in a direction parallel to the face contacted with the driven member (the X axis direction) are excited in the protruding parts 2-1 and 2-2. By the vibration in the MODE-A, motions displacing in a direction perpendicular to the face contacted with the driven member (the Z axis direction) are excited in the protruding parts 2-1 and 2-2. By the combination of the two different vibration modes, elliptical vibrations in the XZ plane are generated on the top surfaces of the protruding parts 2-1 and 2-2. According to the present embodiment too, the resonance frequency difference $\Delta F$ is preferably larger than 0. In other words, FB preferably has a frequency higher than FA.

On both side surfaces of the vibrator 10, so as to have a symmetrical shape in the X direction, the adjusting elements 11 both for the resonance frequency adjustment are arranged. By using the adjusting elements 11, the resonance frequency in the MODE-B can be changed, and it is possible to carry out the adjustment on the frequency difference $\Delta F$. Also, even in a case where the adjustment on the resonance frequency difference $\Delta F$ is required again because of a reason such as a driving condition change, it is possible to easily deal with the situation by the replacement of the impedance element.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-276161 filed Dec. 10, 2010, which is hereby incorporated by reference herein in its entirety.

What is claimed is:

1. A vibration type driving apparatus comprising:
 a vibrator comprising;
 a first electro-mechanical energy conversion element and a second electro-mechanical energy conversion element; and
 an impedance element connected to the second electro-mechanical energy conversion element,
 wherein the second electro-mechanical energy conversion element is connected to the impedance element to form an electric circuit,
 wherein the electric circuit is electrically independent of the first electro-mechanical energy conversion element.

2. The vibration type driving apparatus according to claim 1, wherein at least one of a resistance element, a capacitive element, and an inductor element is connected as the impedance element.

3. The vibration type driving apparatus according to claim 1, wherein the second electro-mechanical energy conversion element is arranged at a location where a total sum of electric charges generated by the vibration in one of the vibration mode among the two vibration modes becomes zero.

4. The vibration type driving apparatus according to claim 1, wherein the vibrator is configured to generate vibrations obtained by combining two different vibration modes with each other by applying an alternating voltage to the first electro-mechanical energy conversion element.

5. The vibration type driving apparatus according to claim 1, wherein the first electro-mechanical energy conversion element is connected to a drive circuit, and wherein the second electro-mechanical energy conversion element is connected to an adjustment circuit comprising the impedance element.

6. A vibration type driving apparatus comprising:
 a vibrator configured to generate vibrations obtained by combining two different vibration modes with each other, the vibrator comprising;
 a first electro-mechanical energy conversion element; and
 a second electro-mechanical energy conversion element comprising;
 electrodes;
 wherein a resonance frequency difference between the two vibration modes is adjusted on the basis of a connection state between the electrodes provided to the second electro-mechanical energy conversion element.

7. The vibration type driving apparatus according to claim 6, wherein the vibrator is configured to generate the vibrations by applying an alternating voltage to the first electro-mechanical energy conversion element.

8. The vibration type driving apparatus according to claim 6, wherein the first electro-mechanical energy conversion element is connected to a drive circuit, and wherein the second electro-mechanical energy conversion element is connected to an adjustment circuit comprising an impedance element.

9. The vibration type driving apparatus according to claim 8, wherein at least one of a resistance element, a capacitive element, and an inductor element is connected as the impedance element.

10. A vibration type driving apparatus comprising:
 a vibrator comprising:
 a first electro-mechanical energy conversion element including a first electrode and a second electrode; and a second electro-mechanical energy conversion element including a third electrode and a fourth electrode; and an impedance element connected to the third electrode and the fourth electrode, wherein the first electrode is not connected to the impedance element.

11. The vibration type driving apparatus according to claim 10, wherein at least one of a resistance element, a capacitive element, and an inductor element is connected as the impedance element.

12. The vibration type driving apparatus according to claim 10, wherein the vibrator is configured to generate vibrations obtained by combining two different vibration modes with each other by applying an alternating voltage to the first electro-mechanical energy conversion element.

13. The vibration type driving apparatus according to claim 12, wherein the second electro-mechanical energy conversion element is arranged at a location where a total sum of electric charges generated by the vibration in one of the vibration mode among the two vibration modes becomes zero.

14. The vibration type driving apparatus according to claim 10, wherein the first electro-mechanical energy conversion element is connected to a drive circuit, and wherein the second electro-mechanical energy conversion element is connected to an adjustment circuit comprising the impedance element.

15. The vibration type driving apparatus according to claim 10, wherein the second electrode and the fourth electrode are included in one electrode.

* * * * *